(12) United States Patent
Yuan et al.

(10) Patent No.: US 11,586,388 B2
(45) Date of Patent: *Feb. 21, 2023

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Willa Lang Yuan, Shanghai (CN); Chark Wenshuai Yu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/352,458

(22) Filed: Jun. 21, 2021

(65) Prior Publication Data

US 2021/0311669 A1    Oct. 7, 2021

Related U.S. Application Data

(63) Continuation of application No. 16/600,310, filed on Oct. 11, 2019, now Pat. No. 11,068,207.

(30) Foreign Application Priority Data

Jun. 10, 2019    (CN) .......................... 201910497484.8

(51) Int. Cl.
    *G06F 3/06*    (2006.01)
(52) U.S. Cl.
    CPC .......... *G06F 3/0659* (2013.01); *G06F 3/0604* (2013.01); *G06F 3/065* (2013.01);
    (Continued)

(58) Field of Classification Search
    None
    See application file for complete search history.

(56) References Cited

U.S. PATENT DOCUMENTS

| 7,991,927 B2 | 8/2011 | Udell et al. |
| 8,214,595 B2 * | 7/2012 | Shimada ................. G06F 13/28 |
| | | 711/119 |

(Continued)

OTHER PUBLICATIONS

Office Action for U.S. Appl. No. 16/600,310 dated Nov. 27, 2020, 19 pages.

*Primary Examiner* — Elias Mamo
(74) *Attorney, Agent, or Firm* — Amin, Turocy & Watson, LLP

(57) ABSTRACT

Storage systems are disclosed. For instance, a storage system comprises a first storage device of a first type and a second storage device of a second type, and the first storage device has a higher access velocity than the second storage device. A threshold indicating a volume limit of data stored in the first storage device can be determined. Data, which is specified by a write request for writing data to the storage system, is written to the first storage device in response to determining the data amount in the first storage device is lower than the threshold. A read request from a client device is processed based on data stored in the first storage device. Consequently, the first storage device with a higher access velocity in the storage system may be utilized as much as possible, so that storage device latency in the storage system is managed more effectively.

20 Claims, 9 Drawing Sheets

(52) U.S. Cl.
CPC ............ *G06F 3/068* (2013.01); *G06F 3/0644* (2013.01); *G06F 3/0653* (2013.01)

(56) References Cited

U.S. PATENT DOCUMENTS

| | | | |
|---|---|---|---|
| 9,036,283 B1 * | 5/2015 | Tsai | G06F 3/0659 |
| | | | 360/31 |
| 9,298,380 B1 | 3/2016 | Tsai et al. | |
| 9,411,719 B2 | 8/2016 | Park | |
| 9,870,826 B2 | 1/2018 | Lin et al. | |
| 2015/0193154 A1 * | 7/2015 | Gong | G06F 3/0608 |
| | | | 711/103 |
| 2017/0111468 A1 * | 4/2017 | Ash | G06F 3/0617 |
| 2017/0229182 A1 * | 8/2017 | Lin | G11C 16/10 |
| 2019/0205034 A1 * | 7/2019 | Mueller-Wicke | G06F 3/0608 |

\* cited by examiner

METHOD, DEVICE, AND COMPUTER PROGRAM PRODUCT FOR MANAGING STORAGE SYSTEM

RELATED APPLICATIONS

The subject patent application is a continuation of, and claims priority to each of, U.S. patent application Ser. No. 16/600,310, filed Oct. 11, 2019, and entitled "METHOD, DEVICE, AND COMPUTER PROGRAM PRODUCT FOR MANAGING STORAGE SYSTEM," which applications each claim further priority to Chinese Patent Application No. 201910497484.8, filed on Jun. 10, 2019, which applications are hereby incorporated into the present application by reference herein in their entireties.

FIELD

The present disclosure generally relates to storage systems, and more specifically, to a method, device and computer program product for managing storage devices in a storage system.

BACKGROUND

With the development of data storage techniques, various data storage devices now provide users with increasingly large data storage volume, and their data access velocity has been improved greatly. A storage system may comprise types of storage devices with different access velocity. At this point, it becomes a hot research topic regarding how to manage various storage devices in a storage system so as to provide the storage system with higher performance.

SUMMARY

Therefore, it is desirable to develop and implement a technical solution for managing a storage system more effectively. It is desired that the technical solution can be compatible with an existing storage system and manage the storage system more effectively by reconstructing various configurations of the existing storage system.

According to a first aspect of the present disclosure, there is provided a method for managing storage devices in a storage system, the storage system comprises a first storage device of a first type and a second storage device of a second type, and the first storage device has a higher access velocity than the second storage device. In the method, a threshold indicating a volume limit of data stored in the first storage device is determined. Data which is specified by a write request for writing data to the storage system is written to the first storage device in response to determining the data amount in the first storage device is lower than the threshold. A read request from a client device is processed based on data stored in the first storage device.

According to a second aspect of the present disclosure, there is provided a device for managing storage devices in a storage system, the storage system comprises a first storage device of a first type and a second storage device of a second type, and the first storage device having a higher access velocity than the second storage device. The device comprises: at least one processor; a volatile memory; and a memory coupled to the at least one processor, the memory having instructions stored thereon, the instructions, when executed by the at least one processor, causing the apparatus to perform acts. The acts include: determining a threshold indicating a volume limit of data stored in the first storage device; in response to determining the data amount in the first storage device is lower than the threshold, writing to the first storage device data which is specified by a write request for writing data to the storage system; processing a read request from a client device based on data stored in the first storage device.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present embodiments. In the drawings.

DETAILED DESCRIPTION OF IMPLEMENTATIONS

The various implementations of the present disclosure will be described in more details with reference to the drawings. Although the drawings illustrate the various implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
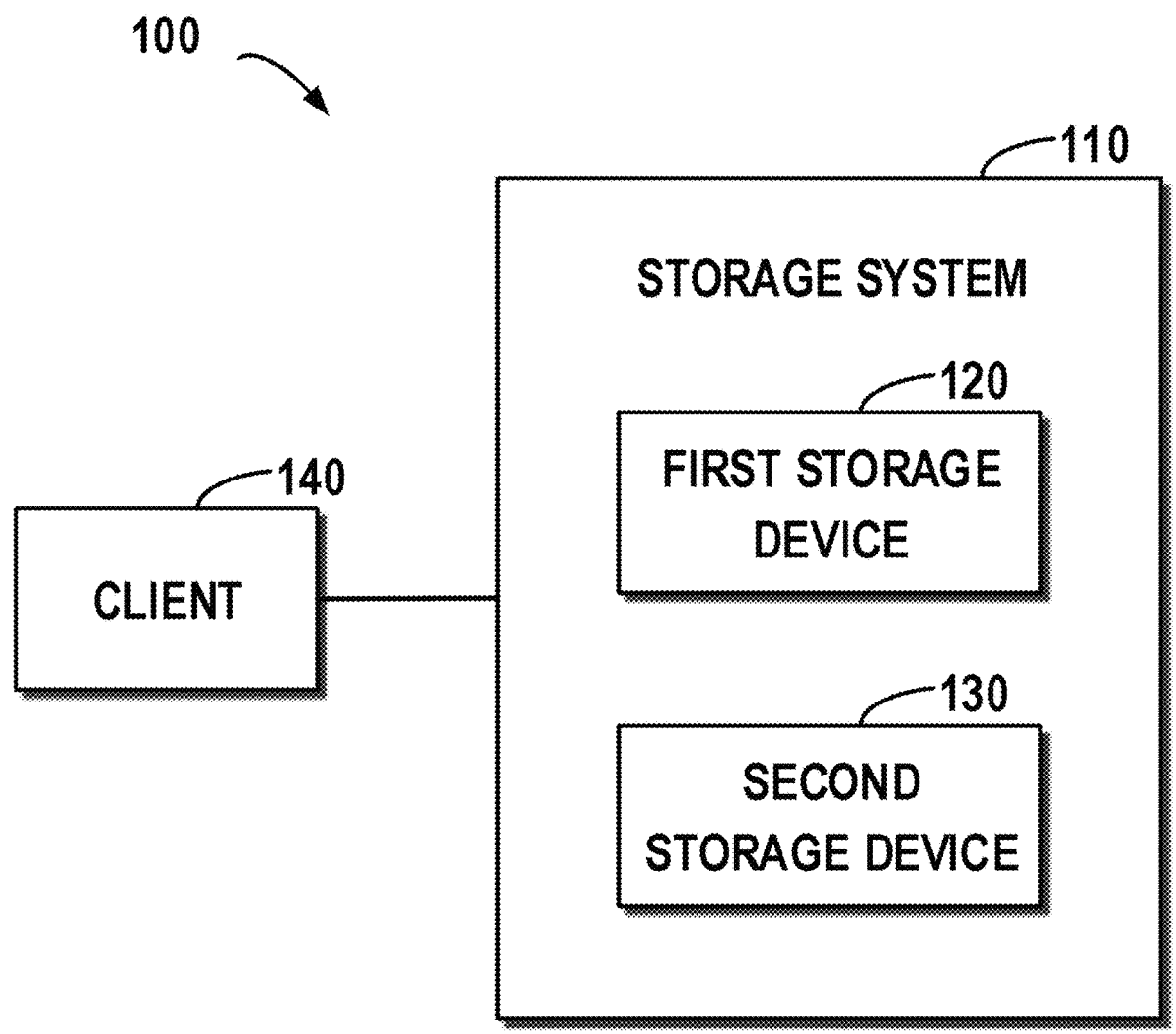
FIG. 1 illustrates a schematic view of a storage system in which example implementations of the present disclosure may be implemented.

FIG. 1 shows a schematic view 100 of a storage system 110 in which example implementations of the present disclosure may be implemented. As depicted, a client 140 may access the storage system 110. For example, the client 140 may write data to the storage system 110. Alternatively and/or additionally, the client 140 may read data from the storage system 110. In order to increase the velocity of writing data to the storage system 110, there have been developed technical solutions for using storage devices with different access velocities.

Specifically, as shown in FIG. 1, the storage system 110 may comprise a first storage device 120 and a second storage device 130. Here the first storage device 120 and the second storage device 130 may be provided as different types, and the first storage device 120 may have a higher access velocity than the second storage device 130. For example, the first storage device 120 may be a solid state disk (SSD) based storage device, and the second storage device 130 may be a hard disk drive (HDD) based storage device.

At this point, when writing data to the storage system 110, data may be first written to the first storage device 120 with a higher access velocity, and then a message about write success may be returned to the client 140. Subsequently, then written data is moved from the first storage device 120 to the second storage device 130 in background mode inside the storage system 110. At this point, for the client 140 outside the storage system 110, it does not care about internal operations of the storage system 100 but believes the write operation is completed at high write velocity.

As the first storage device 120 has a higher access velocity, it is desirable to utilize the first storage device 120 as much as possible for the purpose of improving the overall performance of the storage system 110. Implementations of the present disclosure provide a method, device and computer program product for managing storage devices in the storage system 110. According to example implementations of the present disclosure, the storage system 110 may comprise the first storage device 120 of a first type and the second storage device 130 of a second type, and the first storage device 120 has a higher access velocity than the second storage device 130. In the method, a read request for performing a read operation to the storage system 110 may be processed based on data written to the first storage device 120.

Figure 2:
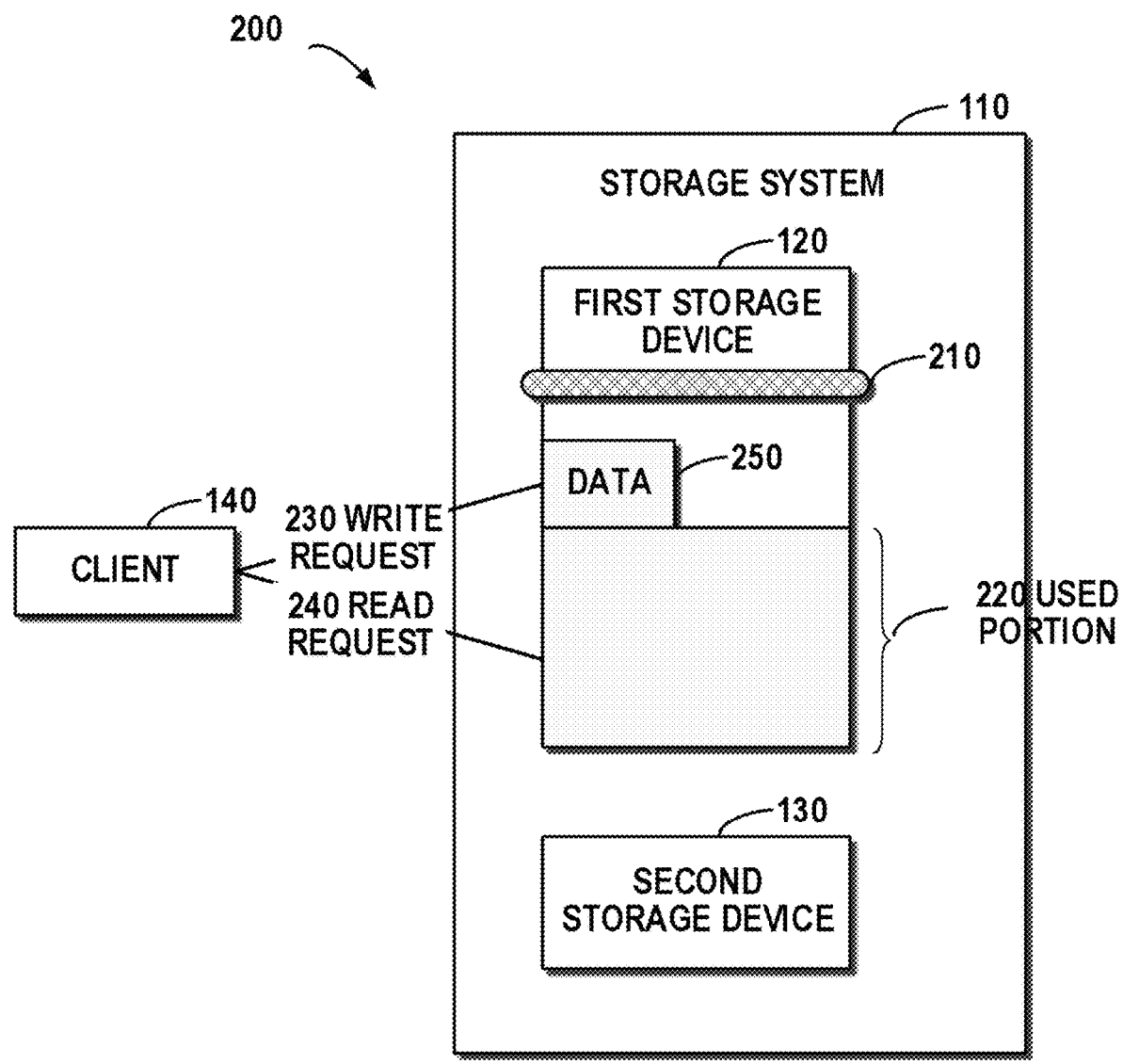
FIG. 2 schematically illustrates a block diagram of the process for managing storage devices in a storage system according to example implementations of the present disclosure.

Specifically, a threshold indicating a volume limit of data stored in the first storage device 120 may be determined; if the data amount in the first storage device 120 is lower than the threshold, then data specified by a write request for writing data to the storage system 110 is written to the first storage device 120. A read request from a client device is processed based on data stored in the first storage device 120. With reference to FIG. 2, description is presented below to more details about implementations of the present disclosure.

FIG. 2 schematically shows a block diagram 200 of the process of managing storage devices in the storage system 110 according to example implementations of the present disclosure. As depicted, a threshold 210 indicating a volume limit of data stored in the first storage device 120 may be determined. During executing a write request 230, if the data amount in a used portion 220 of the first storage device 120 is lower than the threshold 210, then data 250 specified by the write request 230 may be written to the first storage device 120. Subsequently, a read request 240 from the client 140 may be processed based on data (comprising the data 250 and the used portion 220) in the first storage device 120.

With example implementations of the present disclosure, the write request 230 and the read request 240 may be processed separately based on the first storage device 120. Specifically, write velocity of the storage system 110 may be increased using spare space in the first storage device 120, and read velocity of the storage system 110 may be increased using used space in the first storage space. In this way, high-velocity access characteristics of the first storage device 120 may be put into more sufficient utilization, and further response velocity of the storage system 110 may be increased.

Figure 3:
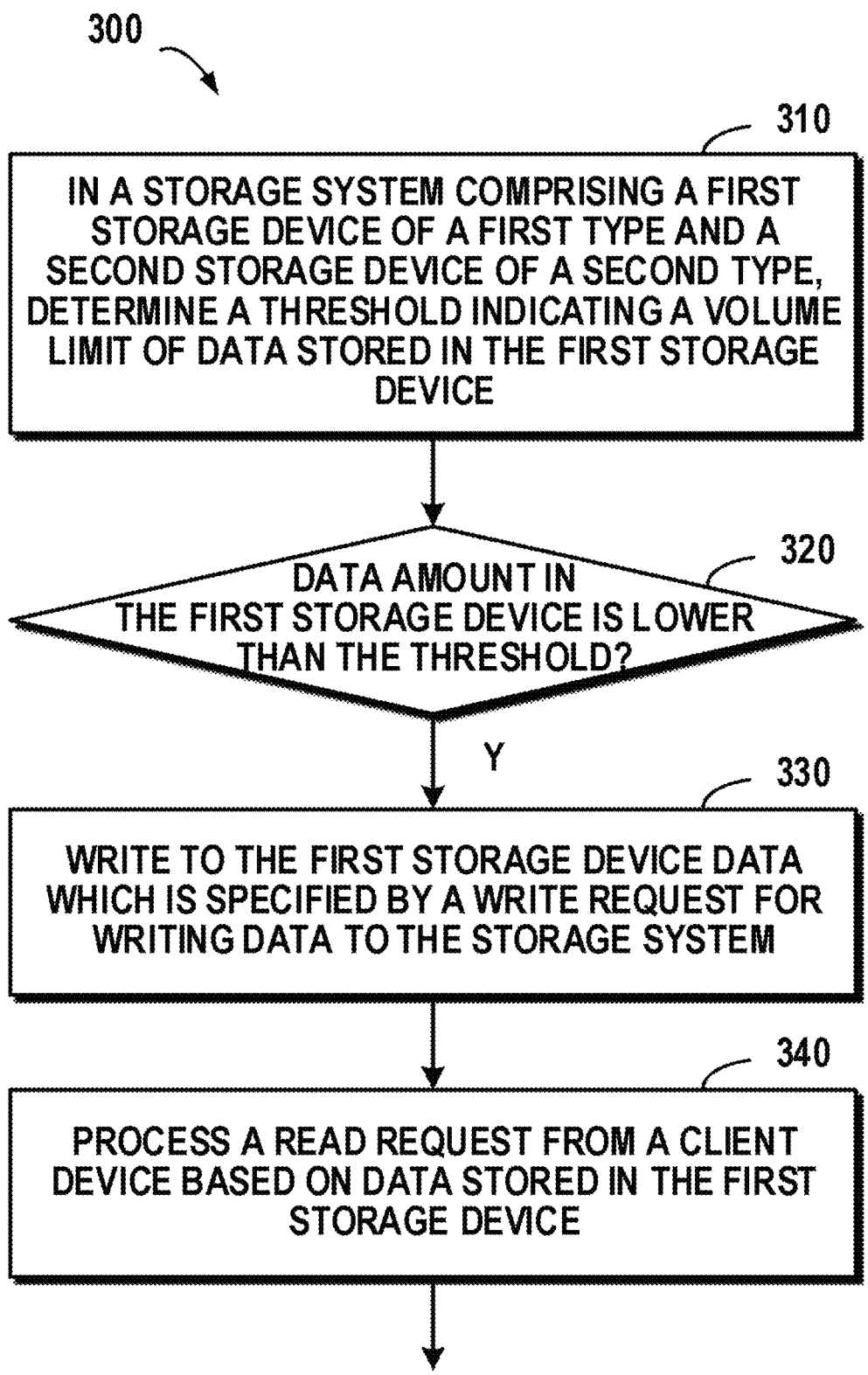
FIG. 3 schematically illustrates a flowchart of a method for managing storage devices in a storage system according to example implementations of the present disclosure.

With reference to FIG. 3, description is presented below to more details on how to manage storage devices in the storage system 110. FIG. 3 schematically shows a flowchart of a method 300 for managing storage devices in the storage system 110 according to example implementations of the present disclosure. At block 310, a threshold indicating a volume limit of data stored in the first storage device 120 may be determined. It will be understood the threshold 210 here is not the maximum volume of the first storage device 120, but is used to indicate a boundary between two states of the first storage device 120.

When the amount of used storage space in the first storage device 120 is lower than the threshold 210, then the first storage device 120 is in write state, i.e. at this point the first storage device 120 may continue to receive a write request from the outside and write data to itself. When the amount of used storage space in the first storage device 120 is higher than the threshold 210, then the first storage device 120 is in migration state, i.e. at this point the first storage device 120 moves data to the second storage device 130. It will be understood the first storage device 120 may perform migration while receiving a write request from the outside. Alternatively and/or additionally, the first storage device 120 may further suspend a write request from the outside and perform data migration, until the data amount in the first storage device 120 is lower than the threshold 210.

It will be understood the threshold 210 is not fixed but variable during operation of the storage system 110. According to example implementations of the present disclosure, the threshold 210 may be determined based on a write velocity of write inputs to the first storage device 120. Specifically, a write velocity of writing data to the first storage device 120 may be obtained. It will be understood the higher the write velocity, the faster the velocity at which spare space in the first storage device 120 is consumed. The primary objective of the first storage device 120 is to provide faster write velocity to the outside. When spare space in the first storage device 120 is not enough, data in the first storage device 120 needs to be moved to the second storage device 130 as soon as possible. At this point, the threshold 210 may be set to a smaller value.

Further, the lower the write velocity, the slower the velocity at which spare space in the first storage device 120 is consumed. At this point, even if most space in the first storage device 120 is used, spare space in the first storage device 120 will not be exhausted promptly. Therefore, read requests may be served by the used portion as far as possible, and the threshold 210 may be set to a larger value.

Thereby, the threshold 210 may be set as inversely proportional to the write velocity $V_{write}$. For example, a value of the threshold $M_{threshold}$ may be determined based on Formula 1 below.

$$M_{threshold} = f1\left(\frac{1}{V_{write}}\right) \quad \text{Formula 1}$$

In Formula 1, $M_{threshold}$ represents a value of the threshold 210, $V_{write}$ represents the write velocity at which data is written to the first storage device 120, and $f1$ represents a function for determining the threshold 210 based on the write velocity. The function $f1$ may be set based on demands of a specific application environment, so long as the threshold 210 determined based on the function is inversely proportional to the write velocity. With example implementations of the present disclosure, when the data amount in the used portion of the first storage device 120 reaches the threshold 210, the storage system 110 may be reminded in advance to perform data movement.

Figure 4:
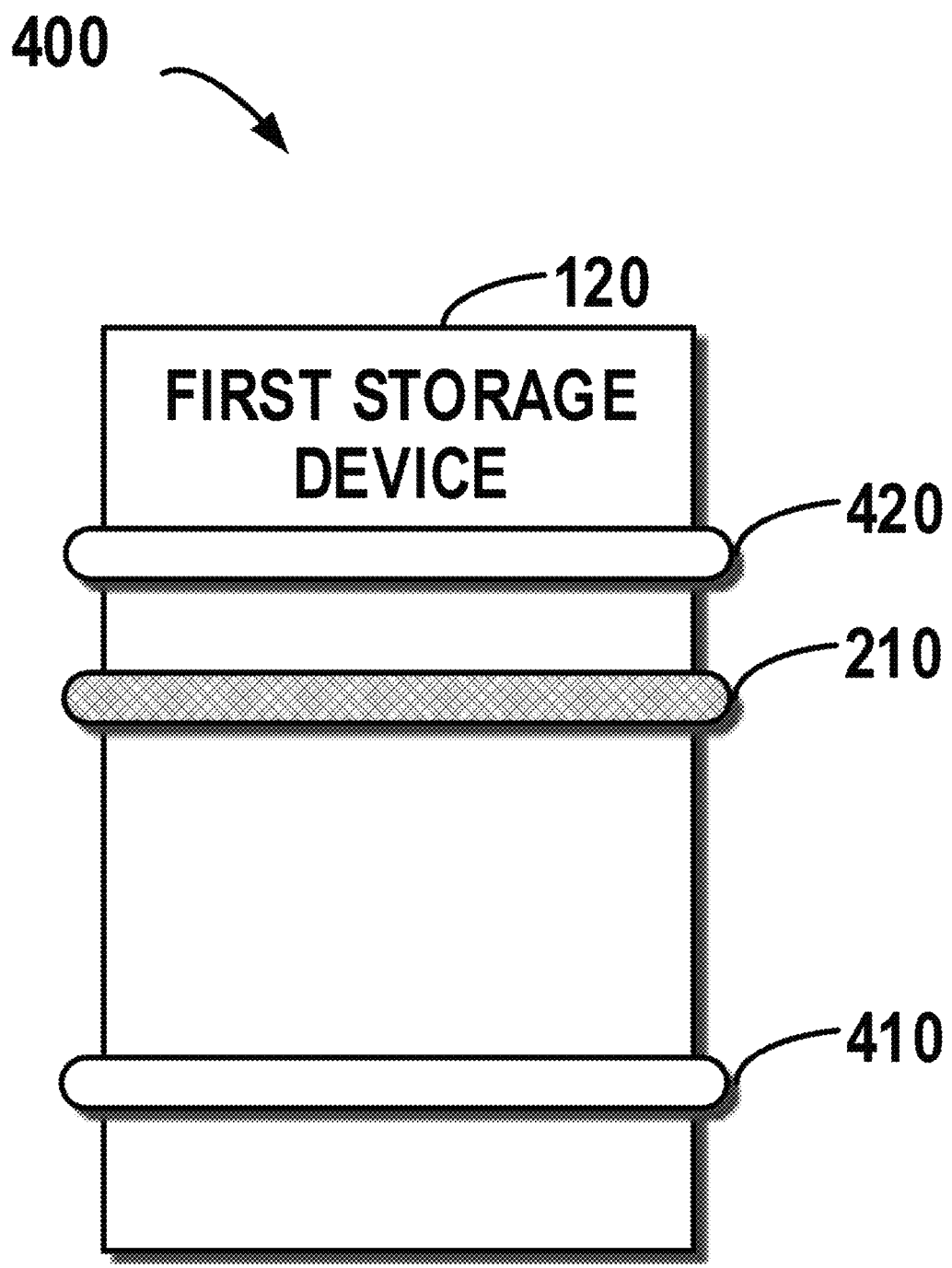
FIG. 4 schematically illustrates a block diagram for determining a threshold of a volume limit of the first storage device according to example implementations of the present disclosure.

According to example implementations of the present disclosure, the threshold may be set based on the storage volume of the first storage device 120. With reference to FIG. 4, description is presented below to more details on how to set the threshold 210. FIG. 4 schematically shows a block diagram 400 for determining the threshold 210 of the volume limit of the first storage device 120 according to example implementations of the present disclosure. The storage volume of the first storage device 120 may be obtained, which refers to the size of space for storing data in the first storage device 120.

The threshold 210 may be determined based on the storage volume $M_{volume}$, e.g. the threshold is proportional to the storage volume, and a value of the threshold $M_{threshold}$ may be determined based on Formula 2 below.

$$M_{threshold} = f2(M_{volume}) \quad \text{Formula 2}$$

In Formula 2, $M_{threshold}$ represents a value of the threshold 210, $M_{volume}$ represents the storage volume for storing data in the first storage device 120, and $f2$ represents a function for determining the threshold 210 based on storage space. The function $f2$ may be set based on demands of a specific application environment, so long as the threshold 210 determined based on the function is proportional to the storage volume.

A minimum value 410 and a maximum value 420 may be set for the threshold 210. Here the minimum value 410 and the maximum value 420 are determined based on the storage volume of the first storage device 120. For example, the minimum value 410 and the maximum value 420 may be set according to a specific percentage of the storage volume or a specific value. The minimum value 410 may be set to 40% of the storage volume or other value, and the maximum value 420 may be set to 80% of the storage volume or other value. According to example implementations of the present disclosure, the threshold 210 may be selected between the minimum value 410 and the maximum value 420.

According to example implementations of the present disclosure, at this point the first storage device 120 will provide services in two aspects: spare space in the first storage device 120 may be used to increase the write velocity of the storage system 110, while used space in the first storage device 120 may be used to increase the read velocity of the storage system 110. By taking into consideration the volume of the first storage device 120, the first storage device 120 can be used to fulfill the above objectives more effectively.

According to example implementations of the present disclosure, the threshold 210 may further be determined based on the write velocity and the storage volume, e.g. based on Formula 3 below.

$$M_{threshold} = f3\left(\frac{1}{V_{write}}, M_{volume}\right) \quad \text{Formula 3}$$

In Formula 3, $M_{threshold}$ represents a value of the threshold 210, $V_{write}$ represents the write velocity of writing data to the first storage device 120, $M_{volume}$ represents the storage volume for storing data in the first storage device 120, and $f3$ represents a function for determining the threshold 210 based on the write velocity and the storage volume. The function $f3$ may be set based on demands of a specific application environment, so long as the threshold 210 determined based on the function is inversely proportional to the write velocity and proportional to the storage volume.

Figure 5:
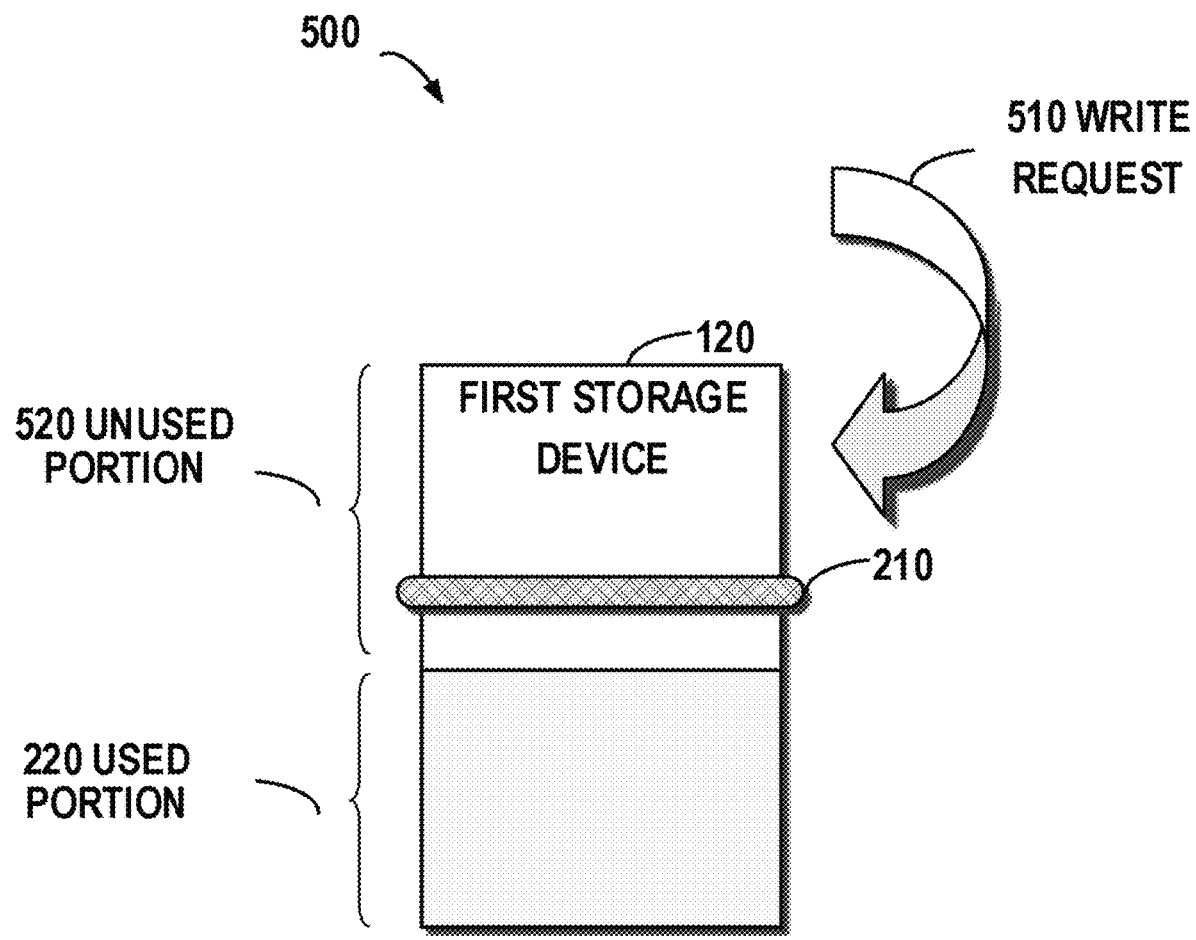
FIG. 5 schematically illustrates a block diagram for writing data to the first storage device according to implementations of the present disclosure.

Returning to FIG. 3, at block 320, it is determined whether the data amount in the first storage device 120 is lower than the threshold 210 or not. Here the data amount refers to the data amount in the used portion of the first storage device 120. If the judgment result at block 320 is "Yes," then at block 330 data specified by a write request for writing data to the storage system 110 is written to the first storage device 120. With reference to FIG. 5, description is presented below to more details on how to write data.

FIG. 5 schematically shows a block diagram 500 of writing data to the first storage device 120 according to example implementations of the present disclosure. As depicted, the first storage device 120 may receive a write request 510. At this point, an unused portion 520 in the first storage device 120 is used to serve the write request 510. If the data amount in a used portion of the first storage device 120 does not reach the threshold 210, then data specified by the write request 510 may be written to the unused portion 520 of the first storage device 120.

Figure 6:
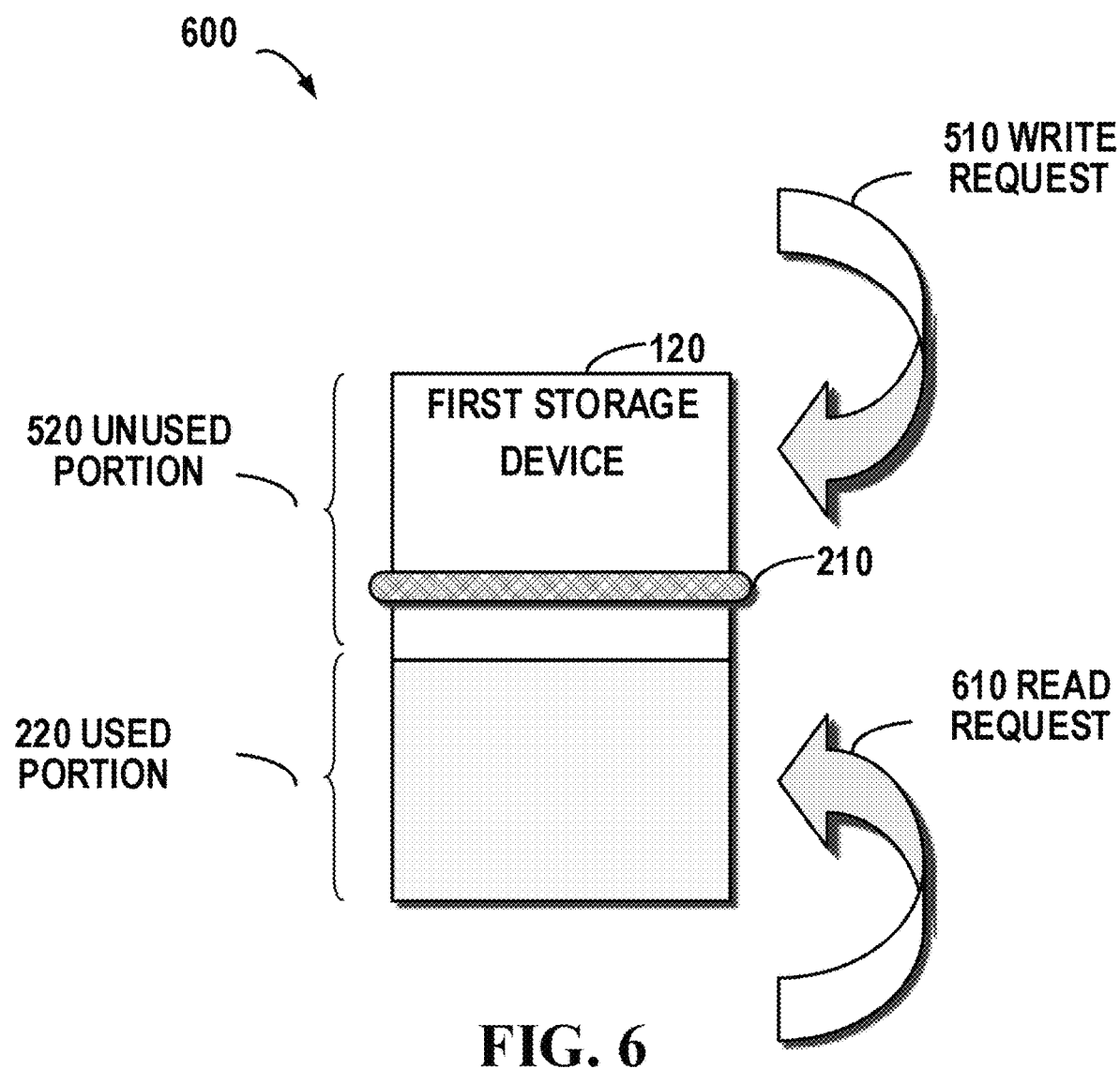
FIG. 6 schematically illustrates a block diagram for processing a read request based on data stored in the first storage device according to implementations of the present disclosure.

Returning to FIG. 3, at block 340, a read request from the client 140 may be served based on data stored in the first storage device 120. With reference to FIG. 6, description is presented below to more details about a read request. FIG. 6 schematically shows a block diagram 600 for serving a read request based on data stored in the first storage device 120 according to example implementations of the present disclosure. As depicted, the unused portion 520 in the first storage device 120 may serve the write request, and the used portion 220 in the first storage device 120 may serve a read request 610.

It will be understood since the access velocity of the first storage device 120 is higher than that of the second storage device 130, the first storage device 120 may serve as a cache of the storage system 110 to respond to the read request 610. According to example implementations of the present disclosure, first a search is conducted in the first storage device 120 to see whether there exists target data specified by the read request 610. If it is determined the target data exists in the first storage device 120 (i.e. hits the cache), the target data is returned to the client device.

It will be understood since data in the first storage device 120 is moved to the second storage device 130, a case might arise in which the first storage device 120 does not contain the target data. At this point, if it is determined the target data is not stored in the first storage device 120, then the target data is searched in the second storage device 130 so as to find the desired target data.

Figure 7:
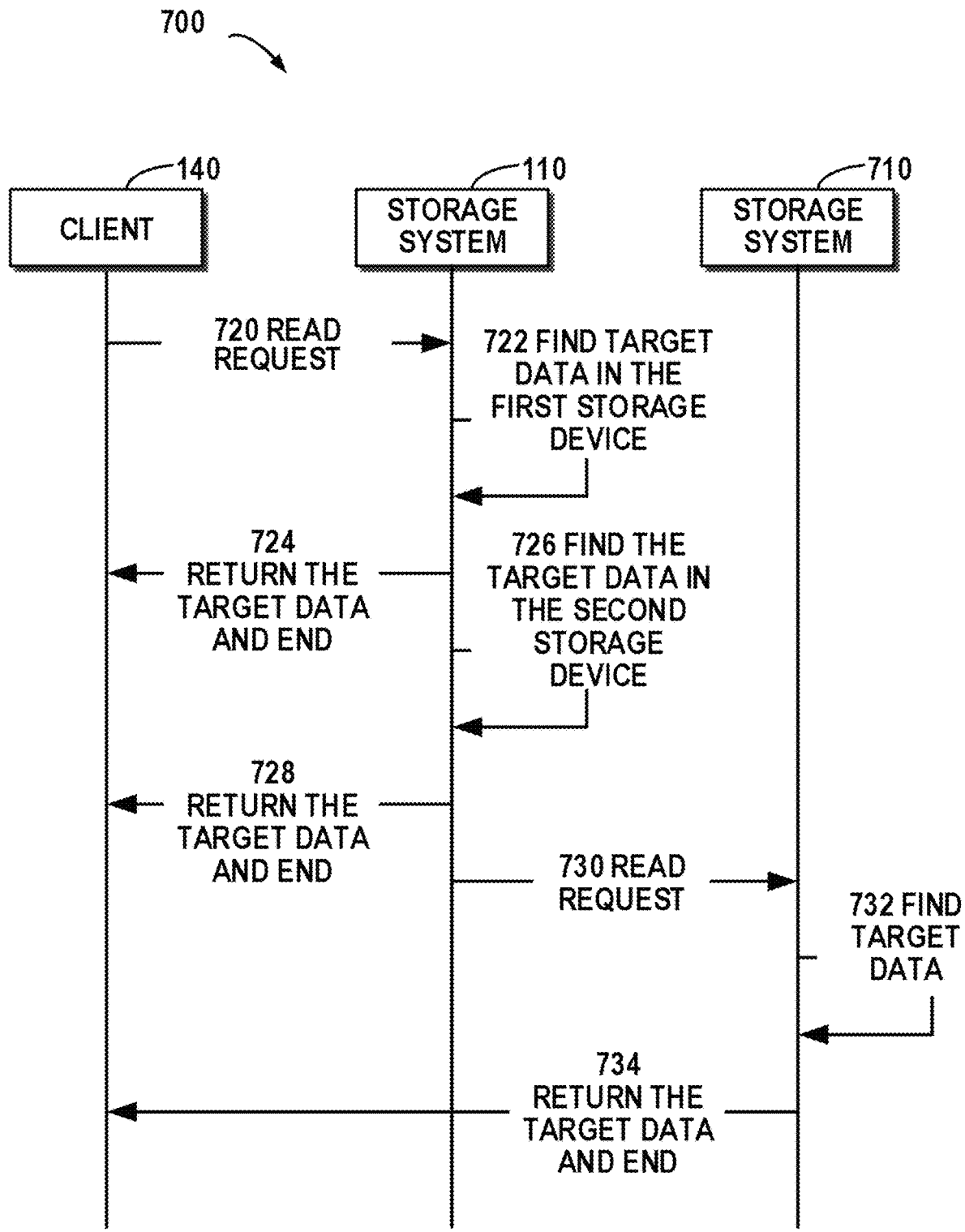
FIG. 7 schematically illustrates a block diagram of the process for managing storage devices in a storage system in a distributed storage system comprising multiple storage systems according to example implementations of the present disclosure.

It will be understood specific implementations of the present disclosure have been described in the context of a separate storage system 110, whereas the storage system 110 may be a storage node in a distributed storage system. At this point, if it is determined the target data is not stored in the second storage device 130 of the storage system 110, the target data may be searched in a further storage node in the distributed storage system. With reference to FIG. 7, description is presented below to more details about searching target data in the distributed storage system.

FIG. 7 schematically shows a block diagram 700 of the process for managing storage devices in the storage system 110 in a distributed storage system comprising multiple storage systems according to example implementations of the present disclosure. As depicted in FIG. 7, the distributed storage system may comprise the storage system 110 and a storage system 710. Like the storage system 110 described with reference to FIG. 1, the storage system 710 may comprise a first storage device 120 and a second storage device 130, the first storage device 120 having an access velocity higher than the second storage device 130. The client 140 may send a read request to the distributed storage system.

As shown by an arrow 720, first the client 140 may send a read request to the storage system 110. Then as shown by an arrow 722, the storage system 110 may search in the first storage device 120 whether there exists target data indicated by the read request. If the target data is found in the first storage device 120, then as shown by an arrow 724, the storage system 110 returns the found target data to the client 140, and the operation ends. As shown by an arrow 726, the storage system 110 may search in the second storage device 130 if there exists the target data indicated by the read request. If the target data is found in the second storage device 130, then as shown by an arrow 728, the storage system 110 returns the found target data to the client 140, and the operation ends.

According to example implementations of the present disclosure, if the target data is not found in either the first storage device 120 or the second storage device 130 of the storage system 110, then as shown by an arrow 730, the storage system 110 may forward the read request to the storage system 710. The storage system 710 may search in itself to see whether there exists the target data. Though not shown in FIG. 7, the target data may be searched in the first storage device 120 and the second storage device 130 of the storage system 710 separately. If the target data is found, then as shown by an arrow 734, the storage system 710 may return the found target data to the client 140, and the operation ends.

With example implementations of the present disclosure, using the method of the present disclosure in a distributed storage system can increase the response velocity of each storage node in the distributed storage system and further improve the overall performance of the distributed storage system.

Example implementations of writing data to the first storage device 120 and serving a read request by the first storage device 120 have been described with reference to the figures. It will be understood since the storage space in the first storage device 120 is limited, data cannot always be written to the first storage device 120. According to example implementations of the present disclosure, if the data amount in the first storage device 120 is higher than the threshold 210, then data is moved from the first storage device 120 to the second storage device 130.

Figure 8:
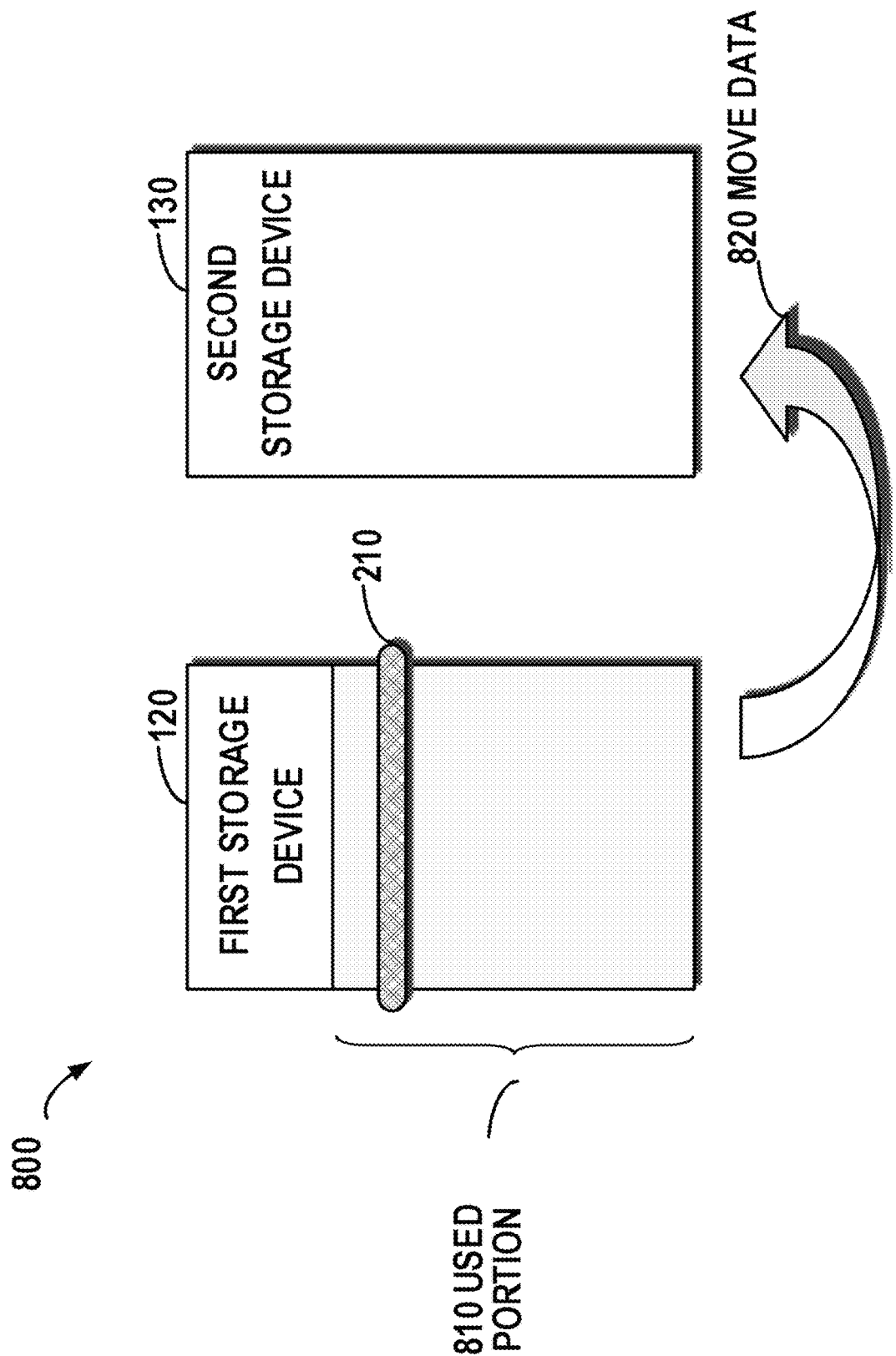
FIG. 8 schematically illustrates a block diagram for moving data from the first storage device to the second storage device according to example implementations of the present disclosure.

Specifically, FIG. 8 schematically shows a block diagram 800 for moving data from the first storage device 120 to the second storage device 130 according to example implementations of the present disclosure. As depicted, when the data amount in a used portion 810 of the first storage device 120 is higher than the threshold 210, at least part of data in the used portion 810 may be moved to the second storage device 130.

According to example implementations of the present disclosure, data blocks in the first storage device 120 may be moved to the second storage device 130 based on the Least Recently Used (LRU) principle. It will be understood since the first storage device 120 mainly functions to increase the response velocity for write requests, then the unused portion in the first storage device 120 is insufficient, data which has not been used recently in the first storage device 120 needs to be moved to the second storage device 130. For example, data may be moved along the direction shown by an arrow 820. In this way, space in the used portion 810 may be released for serving incoming write requests.

According to example implementations of the present disclosure, a timeout threshold may be set for data in the first storage device 120, here the timeout threshold indicating a time duration for which data is retained in the first storage device 120. If data exists in the first storage device 120 for a time that is longer than the timeout threshold, then the data may be moved from the first storage device 120 to the second storage device 130.

According to example implementations of the present disclosure, a timer may be set for data by the unit of block size when data is written to the first storage device 120. When the timer expires, data is moved from the first storage device 120 to the second storage device 130. According to example implementations of the present disclosure, the first storage device 120 may further be partitioned to data blocks with predetermined size, and a timer may be set for each data block.

According to example implementations of the present disclosure, a timeout threshold for data in the first storage device 120 may be determined based on the write velocity of writing data to the first storage device 120. It will be understood the higher the write velocity, the faster the speed at which spare space in the first storage device 120 is consumed.

Since the primary objective of the first storage device 120 is to provide a faster write velocity to the outside, when spare space in the first storage device 120 is insufficient, the residence time of data in the first storage device 120 should be reduced, at which point the timeout threshold may be set to a smaller value. Further, the lower the write velocity, the slower the speed at which spare space in the first storage device 120 is consumed. At this point, even if a larger portion of the first storage device 120 is used, spare space in the first storage device 120 will not be exhausted promptly. At this point, the timeout threshold may be set to a larger value. Therefore, the timeout threshold may be inversely proportional to the write velocity. According to example implementations of the present disclosure, the timeout threshold $T_{threshold}$ may be determined using Formula 4 below.

$$T_{threshold} = f4\left(\frac{1}{V_{write}}\right)$$ Formula 4

In Formula 4, $T_{threshold}$ represents a value of the timeout threshold, $V_{write}$ represents write velocity at which data is written to the first storage device 120, and $f4$ represents a function for determining the timeout threshold based on the write velocity. The function $f4$ may be set based on demands of a specific application environment, so long as the timeout threshold determined based on the function is inversely proportional to the write velocity. With example implementations of the present disclosure, the time for which data resides in the first storage device 120 may be adjusted based on the write velocity at which data is written to the first storage device 120. In other words, if the time duration for which data resides in the first storage device is higher than the timeout threshold, data is moved from the first storage device 120 to the second storage device 130.

According to example implementations of the present disclosure, data in the first storage device 120 may be synchronized with the second storage device 130. The synchronization process may be performed periodically, at which point regarding specific data, after the data is copied to the second storage device 130, a copy of the data may further exist in the first storage device 120. In this way, it may be guaranteed the first storage device 120 may serve access to the data at a higher response velocity. It will be understood the copy is retained only when it is determined the data is accessed frequently. When the data has not been read for a long time, the data may be directly removed from the first storage device 120.

According to example implementations of the present disclosure, both the first storage device 120 and the second storage device 130 are persistent storage devices. It will be understood here the first storage device 120 may be an SSD storage device with a higher access velocity, and the second storage device 130 may be an HDD storage device with a lower access velocity. Since the first storage device 120 has a higher access velocity, the first storage device may further act as a cache for increasing read velocity besides a cache for increasing write velocity. In this way, the overall performance of the storage system 110 may be improved.

While examples of the method according to the present disclosure have been described in detail with reference to FIGS. 2 to 8, description is presented below to the implementation of a corresponding apparatus. According to example implementations of the present disclosure, provided is an apparatus for managing storage devices in a storage system, the storage system comprising a first storage device of a first type and a second storage device of a second type, the first storage device having a higher access velocity than the second storage device. The apparatus comprises: a determining module configured to determine a threshold indicating a volume limit of data stored in the first storage device; a write module configured to, in response to determining data amount in the first storage device is lower than the threshold, write to the first storage device data which is specified by a write request for writing data to the storage system; a processing module configured to process a read request from a client device based on data stored in the first storage device.

According to example implementations of the present disclosure, the determining module comprises: a velocity obtaining module configured to obtain a write velocity of writing data to the first storage device; and a threshold determining module configured to determine the threshold based on the write velocity, the threshold being inversely proportional to the write velocity.

According to example implementations of the present disclosure, the determining module further comprises: a volume obtaining module configured to obtain a storage volume of the first storage device; and the threshold determining module is further configured to determine the threshold based on the storage volume, the threshold being proportional to the storage volume.

According to example implementations of the present disclosure, there are further comprised: a timeout module configured to determine a timeout threshold of the data in the first storage device based on the write velocity, the timeout threshold indicating a time duration for which the data is retained in the first storage device, the timeout threshold being inversely proportional to the write velocity; and a movement module configured to move the data from the first storage device to the second storage device in response to the time duration of the data in the first storage device being higher than the timeout threshold.

According to example implementations of the present disclosure, the movement module is further configured to move the data from the first storage device to the second storage device in response to the data amount in the first storage device being higher than the threshold.

According to example implementations of the present disclosure, the processing module is configured for at least one of: returning target data which is specified by the read request to the client device in response to determining the target data is stored in the first storage device; searching the target data in the second storage device in response to determining the target data is not stored in the first storage device.

According to example implementations of the present disclosure, the storage system is a storage node in a distributed storage system, and the apparatus further comprises: a searching module configured to search the target data in a further storage node in the distributed storage system in response to the target data not being stored in the second storage device.

According to example implementations of the present disclosure, the movement module is further configured to: store data blocks in the first storage device to the second storage device based on the least recently used principle.

According to example implementations of the present disclosure, there is further comprised: a synchronizing module configured to synchronize data in the first storage device with the second storage device.

According to example implementations of the present disclosure, both the first storage device and the second storage device are persistent storage devices.

Figure 9:
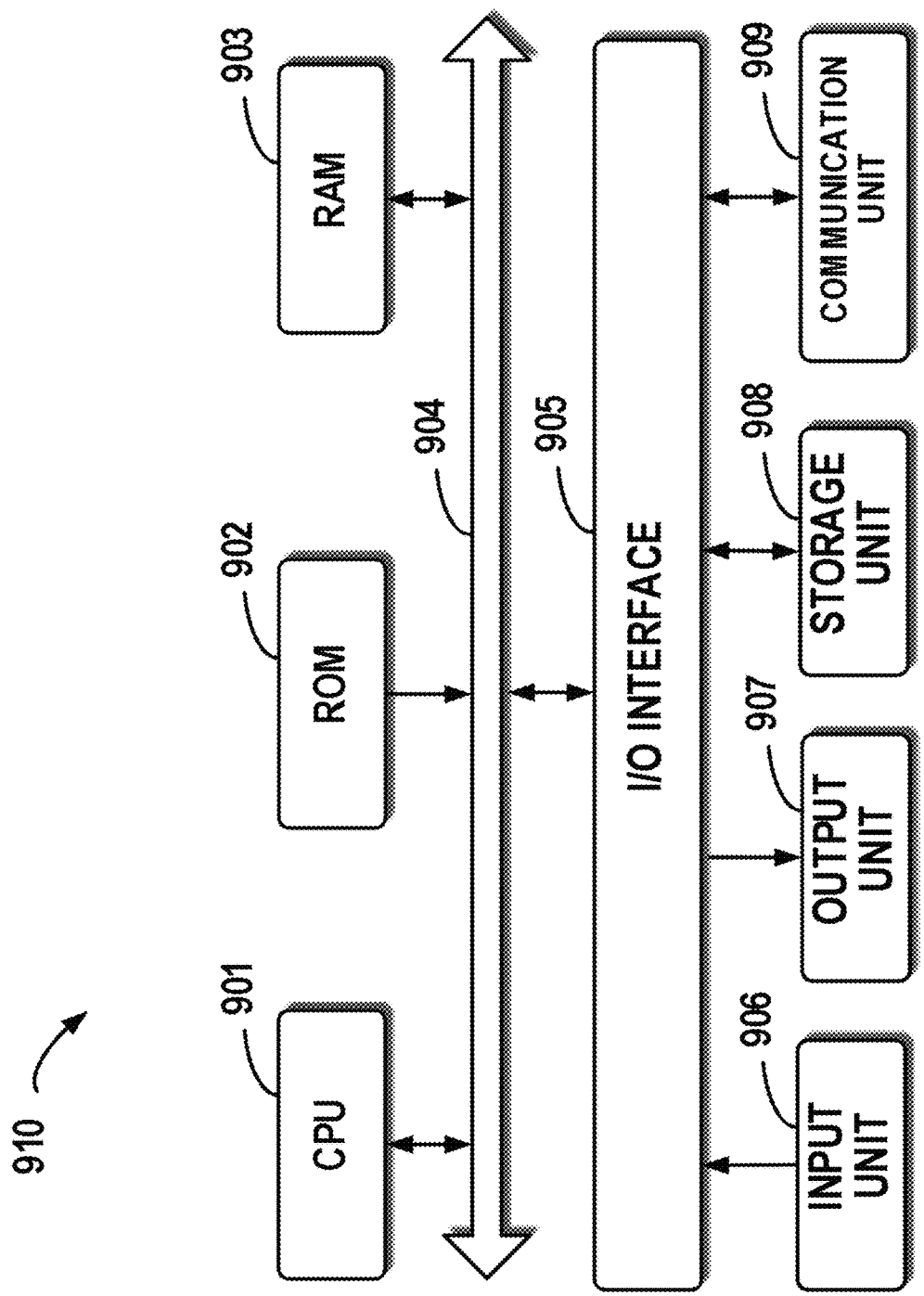
FIG. 9 schematically illustrates a block diagram of a device for managing storage devices in a storage system according to example implementations of the present disclosure.

FIG. 9 schematically shows a block diagram of a device 900 for managing a storage system according to example implementations of the present disclosure. As depicted, the device 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904.

A plurality of components in the device 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the device 900 to exchange information/data with other devices via the computer network, such as Internet, and/or various telecommunication networks.

The above described each process and treatment, such as the method 300 can also be executed by the processing unit 901. For example, in some implementations, the method 300 can be implemented as a computer software program tangibly included in the machine-readable medium, e.g., the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above described methods 400, 700 and 800 can be implemented. Alternatively, in other implementations, the CPU 901 also can be configured in other suitable manners to realize the above procedure/method.

According to example implementations of the present disclosure, there is provided a device for managing a storage system, the storage system comprising a first storage device of a first type and a second storage device of a second type, the first storage device having a higher access velocity than the second storage device. The device comprises: at least one processor; a volatile memory; and a memory coupled to the at least one processor, the memory having instructions stored thereon, the instructions, when executed by the at least one processor, causing the apparatus to perform acts. The acts include: determining a threshold indicating a volume limit of data stored in the first storage device; in response to determining data amount in the first storage device is lower than the threshold, writing to the first storage device data which is specified by a write request for writing data to the storage system; processing a read request from a client device based on data stored in the first storage device.

According to example implementations of the present disclosure, determining a threshold indicating a volume limit of data stored in the first storage device comprises: obtaining a write velocity of writing data to the first storage device; and determining the threshold based on the write velocity, the threshold being inversely proportional to the write velocity.

According to example implementations of the present disclosure, determining a threshold indicating a volume limit of data stored in the first storage device comprises: obtaining a storage volume of the first storage device; and determining the threshold based on the storage volume, the threshold being proportional to the storage volume.

According to example implementations of the present disclosure, the acts further comprise: determining a timeout threshold of the data in the first storage device based on the write velocity, the timeout threshold indicating a time duration for which the data is retained in the first storage device, the timeout threshold being inversely proportional to the write velocity; and moving the data from the first storage device to the second storage device in response to the time duration of the data in the first storage device being higher than the timeout threshold.

According to example implementations of the present disclosure, the acts further comprise: moving the data from the first storage device to the second storage device in response to the data amount in the first storage device being higher than the threshold.

According to example implementations of the present disclosure, processing a read request from a client device based on data stored in the first storage device comprises at least one of: returning target data which is specified by the read request to the client device in response to determining the target data is stored in the first storage device; searching the target data in the second storage device in response to determining the target data is not stored in the first storage device.

According to example implementations of the present disclosure, the storage system is a storage node in a distributed storage system, and the acts further comprise: searching the target data in a further storage node in the distributed storage system in response to the target data not being stored in the second storage device.

According to example implementations of the present disclosure, the acts further comprise: storing data blocks in the first storage device to the second storage device based on the least recently used principle.

According to example implementations of the present disclosure, the acts further comprise: synchronizing data in the first storage device with the second storage device.

According to example implementations of the present disclosure, both the first storage device and the second storage device are persistent storage devices.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

What is claimed is:

1. A method, comprising:
   determining, by a system comprising a processor, a threshold indicating a volume limit of data stored in a first storage device of a first type, wherein a storage system comprises the first storage device of the first type and a second storage device of a second type, wherein the first storage device has a higher access velocity than the second storage device,
   in response to determining that a data amount of first data in the first storage device is lower than the threshold, writing, by the system to the first storage device, second data, which is specified by a write request to write the second data to the storage system, the writing resulting in updated first data stored in the first storage device;
   obtaining a write velocity of writing the second data to the first storage device;
   determining a timeout threshold of the first data in the first storage device based on the write velocity, the timeout threshold indicating a time duration for which the first data is retained in the first storage device, and the timeout threshold being inversely proportional to the write velocity;

moving at least a portion of the first data from the first storage device to the second storage device in response to the time duration of the first data in the first storage device being determined to be higher than the timeout threshold; and processing, by the system, a read request from a requesting device based on the updated first data stored in the first storage device.

2. The method of claim 1, wherein the determining the threshold comprises:

determining the threshold based on the write velocity, the threshold being inversely proportional to the write velocity.

3. The method of claim 1, further comprising:

moving at least a portion of the first data from the first storage device to the second storage device in response to the data amount in the first storage device being determined to be higher than the threshold.

4. The method of claim 1, wherein the processing the read request from the requesting device based on the updated first data stored in the first storage device comprises:

returning target data that is specified by the read request to the requesting device in response to determining the target data is stored in the first storage device.

5. The method of claim 1, wherein the processing the read request from the requesting device based on the updated first data stored in the first storage device comprises:

searching for target data that is specified by the read request to the requesting device in the second storage device in response to determining the target data is not stored in the first storage device.

6. The method of claim 1, wherein the storage system comprises a storage node in a distributed storage system, and wherein the method further comprises:

searching for target data that is specified by the read request to the requesting device in a further storage node, other than the storage node, in the distributed storage system in response to the target data not being stored in the second storage device.

7. The method of claim 1, further comprising:

storing data blocks in the first storage device to the second storage device based on a least recently used principle.

8. The method of claim 1, further comprising:

synchronizing the first data or the updated first data in the first storage device with the second storage device.

9. The method of claim 1, wherein the first storage device and the second storage device are persistent storage devices.

10. A system, comprising:

a processor; and a memory that stores executable instructions that, when executed by the processor, facilitate performance of operations, comprising:

determining a threshold indicating a volume limit for data stored in a first storage device of a first type, wherein a storage system comprises the first storage device of the first type and a second storage device of a second type, and wherein the first storage device has a higher access velocity than the second storage device;

in response to determining that a data amount in the first storage device is lower than the threshold, writing, to the first storage device, data according to a write request to write the data to the first storage device of the storage system, resulting in updated data stored by the first storage device;

based on a write velocity corresponding to the write request, determining a timeout threshold of the data in the first storage device, the timeout threshold indicating a time duration for which the data is retained in the first storage device, the timeout threshold being inversely proportional to the write velocity;

moving the data from the first storage device to the second storage device in response to the time duration of the data in the first storage device being higher than the timeout threshold; and processing a read request from a user device based on the updated data stored in the first storage device.

11. The system of claim 10, wherein the determining the threshold comprises:

obtaining the write velocity from the write request, and determining the threshold based on the write velocity, the threshold being inversely proportional to the write velocity.

12. The system of claim 10, wherein the determining the threshold comprises:

obtaining a storage volume of the first storage device; and determining the threshold based on the storage volume, the threshold being proportional to the storage volume.

13. The system of claim 10, wherein the moving the data comprises:

moving the data from the first storage device to the second storage device in further response to the data amount in the first storage device being higher than the threshold.

14. The system of claim 10, wherein the operations further comprise:

storing data blocks in the first storage device to the second storage device based on a least recently used principle applicable to data block storage.

15. The system of claim 10, wherein the operations further comprise:

synchronizing the data in the first storage device with the second storage device.

16. A non-transitory machine-readable medium, comprising executable instructions that, when executed by a processor, facilitate performance of operations, comprising:

determining a threshold indicating a volume limit applicable to first data stored in a first storage device of a first type, wherein a storage system comprises the first storage device of the first type and a second storage device of a second type, wherein the first storage device has a higher access velocity than the second storage device, and wherein the determining the threshold comprises:

obtaining a storage volume of the first storage device, and determining the threshold based on the storage volume, the threshold being proportional to the storage volume;

in response to determining that a data amount of the first data in the first storage device is lower than the threshold, writing, to the first storage device, second data, which is specified by a write request to write the second data to the storage system, the writing resulting in updated first data stored in the first storage device;

determining a timeout threshold of the first data in the first storage device based on a write velocity corresponding to the write request, the timeout threshold indicating a time duration for which the first data is retained in the first storage device, and the timeout threshold being inversely proportional to the write velocity;

moving at least a portion of the first data from the first storage device to the second storage device in response to the time duration of the first data in the first storage device being determined to be higher than the timeout threshold; and processing a read request from a user device based on the updated first data stored in the first storage device.

17. The non-transitory machine-readable medium of claim 16, wherein the processing the read request from the user device based on the updated first data stored in the first storage device comprises:

returning target data, which is specified by the read request to the user device, in response to determining that the target data is stored in the first storage device.

18. The non-transitory machine-readable medium of claim 16, wherein the processing the read request from the user device based on the updated first data stored in the first storage device comprises:

searching target data, which is specified by the read request to the user device, in the second storage device in response to determining that the target data is not stored in the first storage device.

19. The non-transitory machine-readable medium of claim 16, wherein the storage system is a storage node in a distributed storage system, and wherein the operations further comprise:

in response to target data, which is specified by the read request to the user device, being determined not to be stored at the second storage device, searching for the target data at a different storage node, other than the storage node, in the distributed storage system.

20. The method of claim 1, wherein the determining the threshold comprises:

obtaining a storage volume of the first storage device; and determining the threshold based on the storage volume, the threshold being proportional to the storage volume.

* * * * *